United States Patent [19]
Clark

[11] Patent Number: 6,106,372
[45] Date of Patent: Aug. 22, 2000

[54] TUNGSTEN ELECTRODE SHARPENER

[76] Inventor: Roger T. Clark, 2618 Old Ansel School Rd., Greer, S.C. 29651

[21] Appl. No.: 09/252,939
[22] Filed: Feb. 19, 1999

Related U.S. Application Data
[60] Provisional application No. 60/086,157, May 19, 1998.
[51] Int. Cl.$^7$ .................................................. B24B 19/00
[52] U.S. Cl. ................................. 451/56; 451/45; 451/48
[58] Field of Search .................................. 451/45, 48, 56, 451/189, 234, 386, 394, 241, 282, 349, 358, 359, 545, 549

[56] References Cited

U.S. PATENT DOCUMENTS

| | | |
|---|---|---|
| 2,800,755 | 7/1957 | Perra . |
| 3,305,979 | 2/1967 | Scherer et al. . |
| 3,341,981 | 9/1967 | Baronyak . |
| 3,698,140 | 10/1972 | Steadman ............................. 451/349 X |
| 3,742,652 | 7/1973 | Enders . |
| 3,803,771 | 4/1974 | Bunn . |
| 4,376,603 | 3/1983 | Hudgins ............................. 451/282 X |
| 5,038,525 | 8/1991 | Gardner . |
| 5,400,546 | 3/1995 | Christian et al. ..................... 451/48 X |
| 5,495,988 | 3/1996 | Follese et al. ....................... 451/282 X |
| 5,676,591 | 10/1997 | Huang ................................. 451/349 X |

Primary Examiner—David A. Scherbel
Assistant Examiner—Anthony Ojini
Attorney, Agent, or Firm—Blank, Rome, Comisky & McCauley, LLP

[57] ABSTRACT

An electrode sharpener has a main body that is threaded directly onto a rotary tool. The body includes a base and a housing connected to the base. The base has a threaded bore and a smaller passage centrally located above the bore through which a wheel mandrel protrudes. A shoulder is machined out of the upper end of the base. The housing, which is preferably made from round stock, is bored out such that it slips over the upper end of the base, with lower ends of the housing abutting the shoulder of the base. Fasteners are included to affix the base to the housing. An abrasive grinding wheel is mounted for rotation on the wheel mandrel and is located within the housing. An adjustment grip with knurled edges is adjustably connected to the outer surface of the housing.

23 Claims, 3 Drawing Sheets

FIG. 11
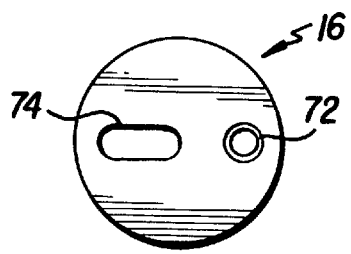
FIG. 12
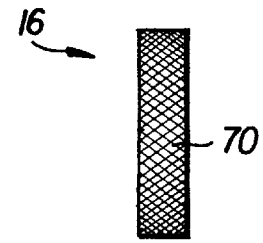
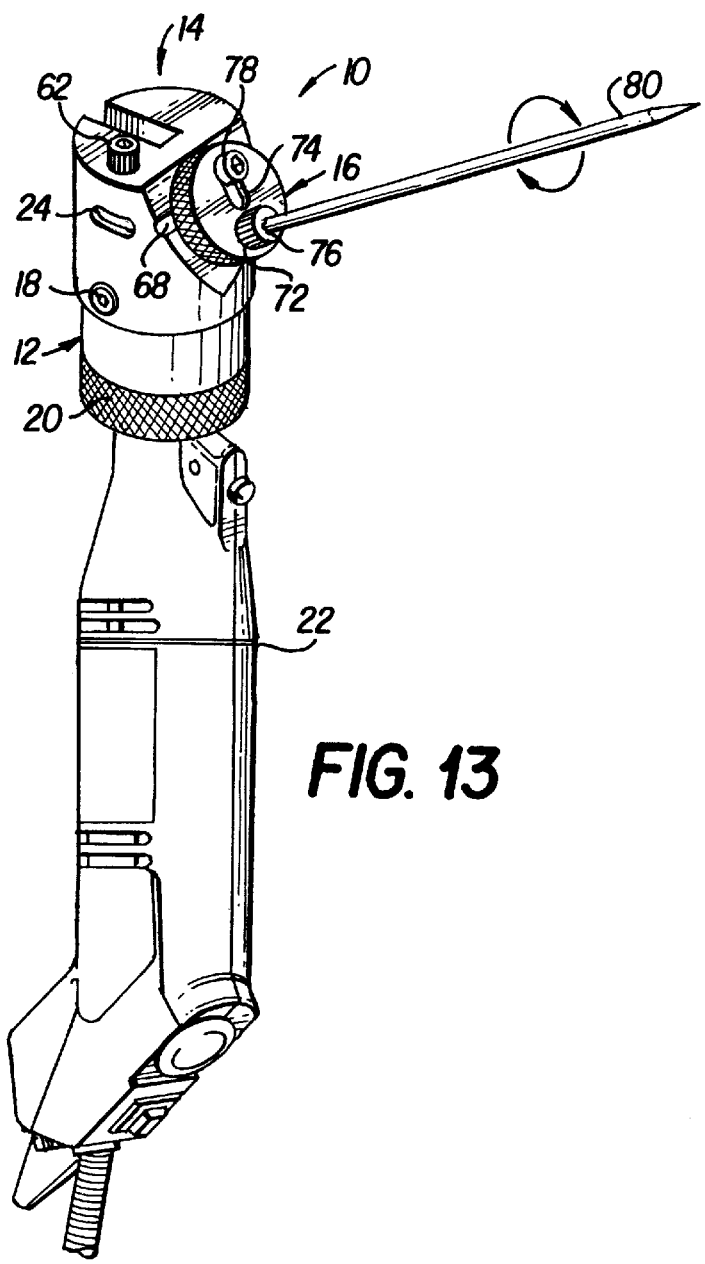
FIG. 13

TUNGSTEN ELECTRODE SHARPENER

REFERENCE TO RELATED APPLICATION

This application claims the benefit of U.S. Provisional Application No. 60/086,157, filed May 19, 1998, the disclosure of which is hereby incorporated by reference in its entirety into the present disclosure.

FIELD OF THE INVENTION

The present invention relates to sharpening devices, and more particularly to a portable electrode sharpener that is readily and securely attached to and powered by a handheld rotary tool.

BACKGROUND OF THE INVENTION

Tungsten electrodes of varying diameters are typically used in conventional welding procedures practiced in a wide variety of industries. During such procedures, an arc is established between the metal to be welded and the end, or point, of each electrode. The electrode point becomes worn or damaged over time, resulting in inadequate or interrupted current transmission. As the quality and efficiency of welds is highly dependent upon the condition of the electrode point, it is important that the point be dressed, or reshaped and sharpened, as needed during welding operations.

U.S. Pat. No. 3,305,979 discloses an electrode dressing apparatus for forming the surfaces of multiple electrodes. The apparatus is connected to a welding machine and includes a mounting assembly, a slide attached to the mounting assembly, a carriage means adjustably mounted on the slide, a dressing disc assembly having an abrasive disc mounted on a rotatable shaft, and electrode holders located on the welding machine. Dressing of the electrodes is accomplished by rotating a knurled knob mounted on the rotatable shaft. The apparatus, as disclosed in U.S. Pat. No. 3,305,979, is inefficient and does not meet existing quality and convenience demands.

Numerous patents, including U.S. Pat. Nos. 5,676,591, 3,742,652, 3,341,981 and 2,800,755 disclose drill bit sharpening apparatus that are operatively attached to power drills. None of those patents, however, disclose apparatus for sharpening electrodes or address the specific needs encountered during electrode dressing operations.

Accordingly, it would be desirable to provide a handheld, portable tungsten electrode sharpening device that mounts directly to an electric or battery operated rotary tool.

SUMMARY OF THE INVENTION

The present invention is directed to an electrode sharpener having a main body that is threaded directly onto a rotary tool. The body includes a base and a housing connected thereto. The base has a threaded bore and a smaller passage centrally located above the bore through which a wheel mandrel protrudes. A shoulder is machined out of the upper end of the base. The housing, which is preferably made from round stock, is bored out such that it slips over the upper end of the base, with lower ends of the housing abutting the shoulder of the base. Fasteners are included to affix the base to the housing. An abrasive grinding wheel is mounted for rotation on the wheel mandrel and is located within the housing. An adjustment grip with knurled edges is adjustably connected to the outer surface of the housing.

The housing includes multiple slots and openings for providing access to the grinding wheel. One side of the housing is sloped and includes a first slot. The adjustment grip overlies the sloped side and includes a threaded hole which, when aligned with the first slot, defines a passage to the grinding wheel through which the electrode point passes. For facilitating the sharpening of electrodes of various sizes, the threaded hole accepts interchangeable bushings having bores of varying diameters. The first slot has dimensions for allowing vertical and linear adjustment, thereby providing for utilization of all abrasive surfaces of the grinding wheel. A second opening also having means for accepting interchangeable bushings is located through the top surface of the housing and is used for electrode tip flattening procedures. A wide, angled slot is located in the side of the housing opposite the sloped side to allow for trimming of electrodes that are too large to fit through the other openings. A window is also provided through one side of the housing to provide for viewing of the sharpening operation.

Advantageously, the electrode sharpener is ready for use at any location by simply threading the base of the device onto a rotary tool, inserting the mandrel with the grinding wheel attached thereto into the receiving chuck of the tool, and attaching the housing to the base such that the grinding wheel is enclosed therein. An electrode to be sharpened is then fed through one of the openings or slots and into the cavity defined by the walls of the housing. To commence the sharpening procedure, the user actuates the rotary tool, causing the grinding wheel to rotate. The electrode is then brought into contact with the rotating wheel and is manually rotated until a desired sharpening is achieved. Precise control is facilitated by the window in the side of the housing and the handheld nature of the device.

With the foregoing and other objects, advantages and features of the invention that will become hereinafter apparent, the nature of the invention may be more clearly understood by reference to the following detailed description of the invention, the appended claims and to the several views illustrated in the attached drawings.

BRIEF DESCRIPTION OF THE DRAWINGS

FIG. 11 is a front elevational view of the adjustment knob of the present invention;

FIG. 12 is a side elevational view of the adjustment knob of FIG. 11; and FIG. 13 is a perspective view of the sharpener connected to a rotary tool.

DETAILED DESCRIPTION OF THE INVENTION

Figure 1:
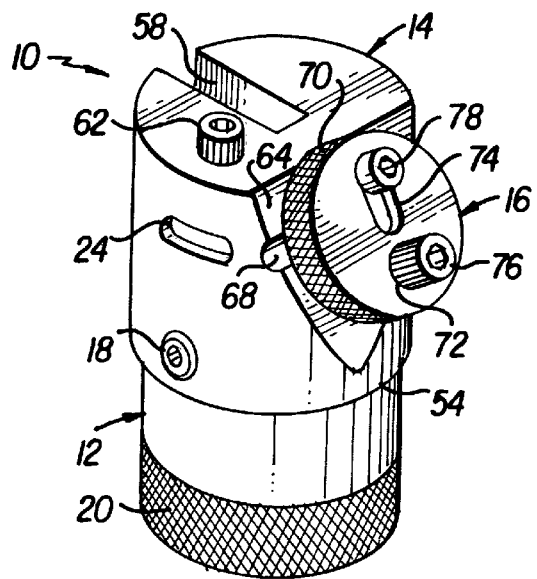
FIG. 1 is a front perspective view of the present invention.

Referring now in detail to the drawings, there is shown in FIG. 1 an electrode sharpener apparatus according to the present invention which is designated by the reference numeral 10. In a preferred form, the apparatus 10 includes a base 12, a housing 14 and an adjustment knob 16. The housing 14 slides over the upper end of the base 12 and is connected thereto by fasteners 18, such as screws, pins or the like. The base 12 has a knurled outer surface 20 proximate its lower end to aid in threading the base 12 onto a rotary tool 22 (FIG. 13). The housing 14 encloses a grinding wheel (not shown) that is rotatably secured to the rotary tool 22 by a shaft (not shown). Access to the grinding wheel is provided by openings located along multiple surfaces of the housing 14. A window 24 is also located along a side of the housing 14 to provide visual access to the grinding wheel and, thus, the sharpening process. Adjustment knob 16 having multiple apertures extending therethrough is adjustably connected to a side of the housing 14. The electrode point to be sharpened may then be fed through the apertures and openings in the housing 14 and brought into contact with the rotating grinding wheel.

Figure 2:
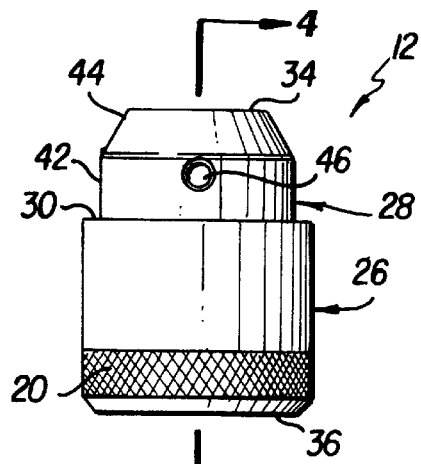
FIG. 2 is a front elevational view of the base of the present invention.
Figure 3:
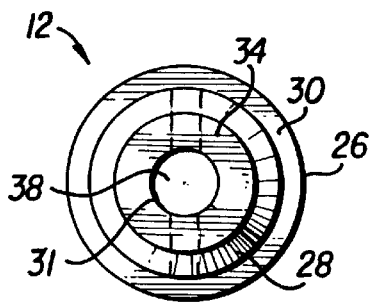
FIG. 3 is a top plan view of the base of FIG. 2.
Figure 4:
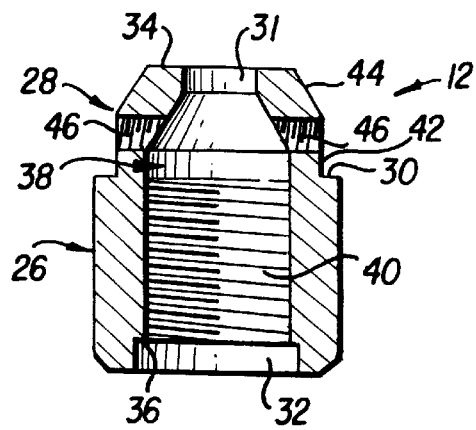
FIG. 4 is a cross-sectional view of the base taken along line 4—4 of FIG. 2.
Figure 10:
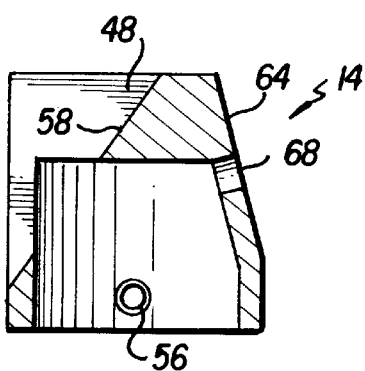
FIG. 10 is a cross-sectional view of the housing taken along line 10—10 of FIG. 6.
Figure 5:
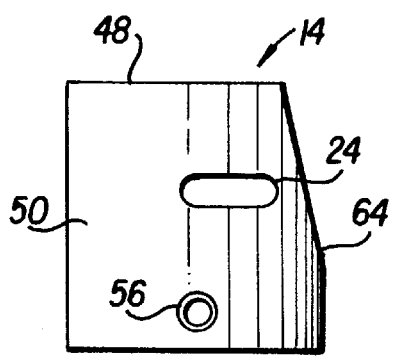
FIG. 5 is a front elevational view of the housing of the present invention.
Figure 6:
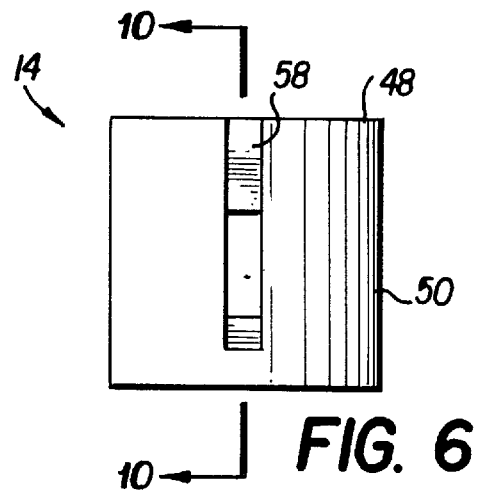
FIG. 6 is a left side elevational view of the housing of FIG. 5.
Figure 7:
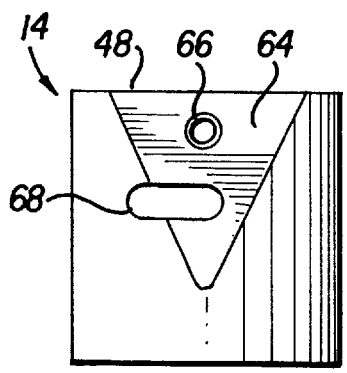
FIG. 7 is a right side elevational view of the housing of FIG. 5.
Figure 8:
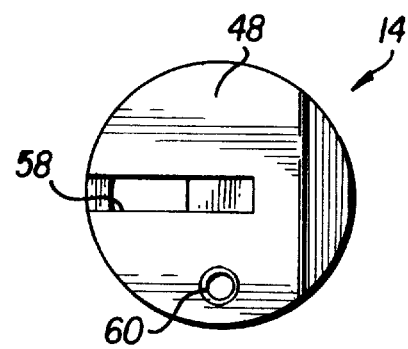
FIG. 8 is a top plan view of the housing of FIG. 5.
Figure 9:
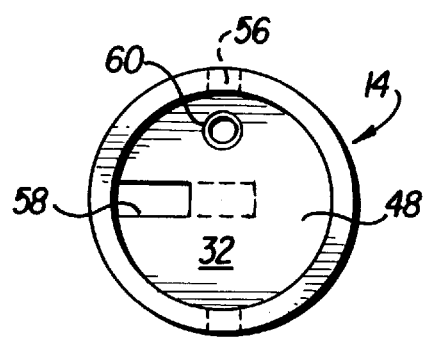
FIG. 9 is a bottom plan view of the housing of FIG. 5.

Referring to FIGS. 2–4, the base 12 has a generally cylindrical cross-section and includes a wide lower portion 26, a narrow upper portion 28 and a ledge 30 formed where the lower portion 26 meets the upper portion 28. Openings 31, 32 are provided in the top 34 and the bottom 36 of the base 12. An axial passage 38 extends through the base 12 and interconnects the openings 31, 32. At least a part of the passage 38 defined by the inner surfaces of the lower portion 26 of the base 12 is threaded 40. The upper portion 28 of the base 12 includes generally vertical lower walls 42 that join the walls of the lower portion 26 of the base 12 and inwardly sloping walls 44 extending upward therefrom. Radial holes 46, which are preferably threaded, extend through the lower walls 42 of the upper portion 28 for receiving the fasteners 18.

Referring to FIGS. 5–10, the housing 14, which is preferably made from round stock, includes a top 48 and side walls 50 defining a wheel-receiving cavity 52. Cavity 52 has dimensions which allow the housing 14 to be easily slipped over the upper portion 28 of the base 12. As shown in FIG. 1, the bottom edges 54 of the housing 14 abut the ledge 30 of the base 12 when the apparatus 10 is assembled. Small radial holes 56 are located along the side walls 50 of the housing 14. To secure the housing 14 to the base 12, small holes 56 are aligned with radial holes 46 in the upper portion 28 of the base 12 and fasteners 18 are inserted therethrough. The fasteners 18 are preferably of the non-permanent variety and easily removable using a screwdriver or the like.

The housing 14 encloses a rotatable grinding wheel. Access to the grinding wheel for sharpening procedures is provided by numerous openings located in the top 48 and side walls 50 of the housing 14. One access means is an angled slot 58 provided through the top 48 and along one side of the housing 14. The grinding wheel rotates through the slot 58. The slot 58 provides a quick means for cutting the electrode to length and is preferably large enough to allow damaged or frayed ends of electrodes to pass therethrough for removal.

The top 48 of the housing 14 further includes a small opening 60 which is preferably threaded for receiving interchangeable bushings 62 of various diameters. The bushing selected is dependent upon the size of the electrode to be sharpened.

The side 64 of the housing 14 opposite the angled slot 58 is sloped and has a hole 66 and an elongated opening 68 located therein. The opening 68 has dimensions which allow for maximum lineal and vertical adjustment of the electrode position, further enabling all abrasive surfaces of the wheel to the utilized. As shown in FIG. 1, the adjustment knob 16 overlies the sloped side 64 when the apparatus 10 is fully assembled. As shown in FIGS. 11 and 12, knob 16 has a generally circular cross-section, knurled edges 70, and a pair of openings 72, 74 extending therethrough. One opening 72 is a threaded hole for receiving a removable bushing 76. The second opening 74 is an elongated slot. When assembled, the slot 74 of the knob 16 is aligned with hole 66 of the housing 14. A connecting means 78, such as a screw or pin, extends through the slot 74 and hole 66 for securing the knob 16 to the housing 14. Further, the hole 72 in the knob 16 is aligned with the slot 58 in the housing 14, thereby providing a continuous passage from the outside to the inside of the housing 14.

The housing 14 further includes a window 24 located in one side wall thereof. The window 24 is preferably an elongated slit. A transparent structure may be positioned in the slit.

Referring to FIG. 13, the base 12 of the sharpener 10 is attached to and powered by a rotary tool 22, such as a drill. The rotary tool 22 is preferably a handheld device that is either electric or battery powered. A grinding wheel (not shown) is mounted on a mandrel (not shown) which passes through the base 12 of the sharpener 10 and is releasably secured to the chuck (not shown) of the rotary tool 22. The housing 14, with the adjustment knob 16 attached thereto, is positioned over the wheel and is connected to the upper portion 28 of the base 12 using releasable fasteners 18. The sharpening process is commenced by inserting an end of an electrode 80 through the passage defined by bushing 76, hole 72 and slot 68. The rotary tool 22 is then energized, causing the wheel to rotate. The electrode point is manually brought into contact with the wheel. All portions of the electrode tip are treated (i.e. brought into contact with the wheel) by manually rotating the electrode 80 as shown in FIG. 13. Adjustments in position of the electrode 80 relative to the surface of the wheel are provided by rotating. the knob 16. If a flattened tip is desired, the electrode 80 is inserted through bushing 62 in hole 60 located at the top 48 of the housing 14. Where the electrode 80 is too large or damaged to pass through the bushings 62 or 76, or for cutting the electrode to size, a user simply slides the electrode 80 into the angled slot 58.

Numerous variations of the preferred embodiment are contemplated. For example, the number of openings in the housing, or the locations thereof, may be changed without departing from the scope of the present invention. Also, other acceptable means besides threads for securely connecting the sharpener to the rotary device are within the scope of the invention. Further, any acceptable fasteners or rotary devices may be used. It should also be understood that while the present invention has been disclosed with reference to electrode sharpening applications, other sharpening applications are contemplated and are considered to be within the spirit and scope of the present invention.

From the foregoing, it should be readily apparent and appreciated by those skilled in the art that the present invention provides a particularly convenient, easy to use and highly effective device for use in electrode sharpening applications.

Although certain presently preferred embodiments of the invention have been specifically described herein, it will be apparent to those skilled in the art to which the invention pertains that variations and modifications of the various embodiments shown and described herein may be made without departing from the spirit and scope of the invention. Accordingly, it is intended that the invention be limited only to the extent required by the appended claims and the applicable rules of law.

What is claimed is:

1. A workpiece holder and alignment head, comprising: a body member extending along and about a longitudinal axis and having a top surface, a bottom surface disposed opposite the top surface and a side surface extending between the top and bottom surfaces with the top and bottom surfaces extending radially from the longitudinal axis, the body member having a cavity formed into the bottom surface and extending longitudinally into the body member toward the top surface, the side surface having a side surface hole formed therethrough in communication with the cavity and extending along a side surface hole axis oriented at an inclined angle relative to the longitudinal axis.

2. A workpiece holder and alignment head according to claim 1, wherein the top surface has a top surface hole formed therethrough in communication with the cavity and extending along a top surface hole axis oriented parallel to the longitudinal axis.

3. A workpiece holder and alignment head according to claim 2, wherein the side surface hole and top surface hole are sized to slidably receive the workpiece.

4. A workpiece holder and alignment head according to claim 2, wherein the body member includes a channel formed into the top surface and side surface and extending into the body member in communication with the cavity.

5. A workpiece holder and alignment head according to claim 2, wherein the side surface includes an inclined surface defining a plane intersecting the top surface and the longitudinal axis.

6. A workpiece holder and alignment head according to claim 5, wherein the side surface hole is formed in the inclined surface.

7. A workpiece holder and alignment head according to claim 1, wherein the body member includes an inner surface defining the cavity and having a plurality of threads formed thereinto, the plurality of threads commencing at or adjacent the bottom surface and extending toward the top surface.

8. A workpiece holder and alignment head assembly, comprising:
   a base extending along and about a first longitudinal axis and having a bore extending axially therethrough;
   a housing extending along and about a second longitudinal axis and having a top wall, a side wall extending generally perpendicularly from the top wall and an inclined wall extending at an angle from the top wall and connected to the top and side walls forming an inclined surface oriented at an inclination relative to the second longitudinal axis, at least the top wall and the side wall connected together to define a longitudinally extending cavity within the housing, the inclined wall having a slot formed therethrough and in communication with the cavity, the housing and the base being releasably connectable to each other when the first and second longitudinal axes are substantially aligned so that the bore and the cavity mate; and
   an adjustment knob releasably connected to the housing and operative to move into and remain at any selected position on the inclined surface along the slot, the adjustment knob having a hole formed therethrough and in communication with the cavity at said selected position along the slot.

9. A workpiece holder and alignment head assembly according to claim 8, wherein the adjustment knob includes an adjustment knob slot and connecting means operative in conjunction with the adjustment knob slot for releasably securing the adjustment knob at the any selected position on the inclined surface along the slot.

10. A workpiece holder and alignment head assembly according to claim 8, wherein the adjustment knob includes a bushing defining the hole through the adjustment knob.

11. A workpiece holder and alignment head assembly according to claim 8, wherein the housing has a window for viewing from exteriorly of the workpiece holder and the alignment head assembly and into the cavity.

12. A workpiece holder and alignment head assembly according to claim 8, wherein the bore is threaded.

13. A workpiece holder and alignment head assembly according to claim 8, further comprising at least one fastener operative for releasably connecting the base and housing together.

14. A workpiece holder and alignment head assembly according to claim 8, wherein the top wall includes a top wall hole formed therethrough and in communication with the cavity.

15. A workpiece holder and alignment head assembly according to claim 14, wherein the housing includes a housing bushing defining the top wall hole.

16. A workpiece holder and alignment head assembly according to claim 14, wherein the housing includes a straight channel formed into the top wall and the side wall and in communication with the cavity.

17. An apparatus for grinding an elongated workpiece having a length and an end portion, the apparatus comprising:
    a rotary tool having a grinding wheel mounted for rotation about an axis, the grinding wheel having a flattened grinding surface extending radially from the axis and a circular grinding surface extending circumferentially about the axis, the flattened grinding surface and the circular grinding surface intersecting each other to form a circular grinding edge; and
    a body member releasably connected to the rotary tool and extending longitudinally along and about the axis, the body member having a top surface, a bottom surface disposed opposite the top surface and a side surface extending between the top and bottom surfaces with the top and bottom surfaces extending radially from the axis, the body member having a cavity formed longitudinally along the axis through the bottom surface and into the body member and sized to receive the grinding wheel, the side surface having a side surface hole formed therethrough in communication with the cavity and extending along a side surface hole axis oriented at an inclined angle relative to the axis, the side surface hole sized to slidably receive the workpiece such that the end portion contacts the flattened grinding surface for grinding.

18. An apparatus according to claim 17, wherein each one of the body member and the rotary tool are threaded for releasable connection to one another.

19. An apparatus according to claim 17, wherein the side surface includes an inclined surface defining a plane intersecting the top surface and the axis, the inclined surface including the side surface hole.

20. An apparatus according to claim 19, wherein the side surface hole is an elongated slot.

21. An apparatus according to claim 20, further comprising an adjustment knob releasably connected to the body member and operative to move into and remain at any selected position on the inclined surface along the slot, the adjustment knob having an adjustment knob hole formed therethrough and in communication with the cavity at said selected position along the slot.

22. An apparatus according to claim 17, wherein the top surface includes a top surface hole extending through the top surface in communication with the cavity and along a top surface axis being oriented in parallel with the axis, the top surface hole sized to slidably receive the workpiece so that the end portion contacts the flattened grinding surface for grinding.

23. An apparatus according to claim 22, wherein the body member includes a straight channel formed into the top surface and the side surface and in communication with the cavity, the straight channel sized to receive the workpiece along its length so that the circular grinding edge of the grinding wheel is operative to grind the length of the workpiece.

* * * * *